(No Model.) 3 Sheets—Sheet 1.

J. H. GREENSTREET.
INDICATING AND RECORDING BALANCE.

No. 478,232. Patented July 5, 1892.

WITNESSES: INVENTOR

Jason H. Greenstreet,
per
ATTORNEYS.

(No Model.) 3 Sheets—Sheet 2.
J. H. GREENSTREET.
INDICATING AND RECORDING BALANCE.
No. 478,232. Patented July 5, 1892.
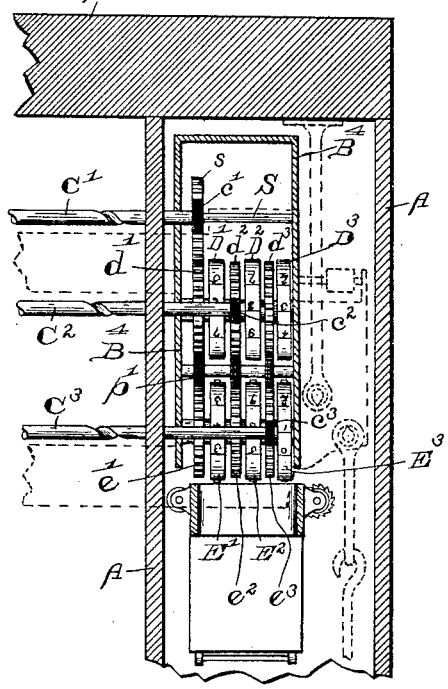
Fig. 3.
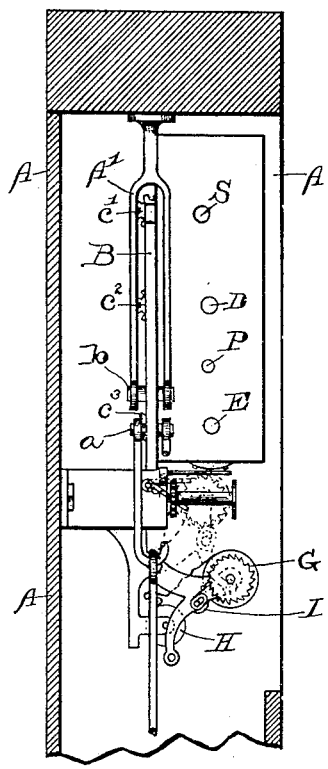
Fig. 4.
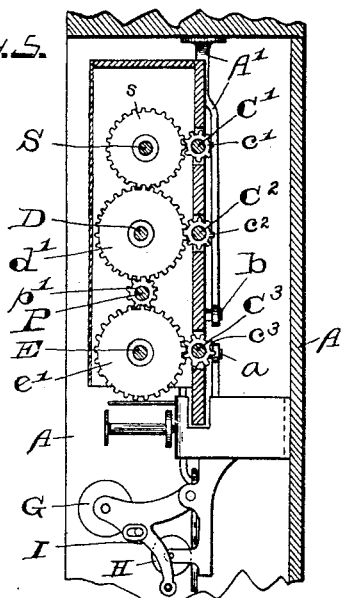
Fig. 5.
Fig. 6.
WITNESSES: INVENTOR
Jason H. Greenstreet,
per
ATTORNEYS.

(No Model.) 3 Sheets—Sheet 3.
J. H. GREENSTREET.
INDICATING AND RECORDING BALANCE.
No. 478,232. Patented July 5, 1892.
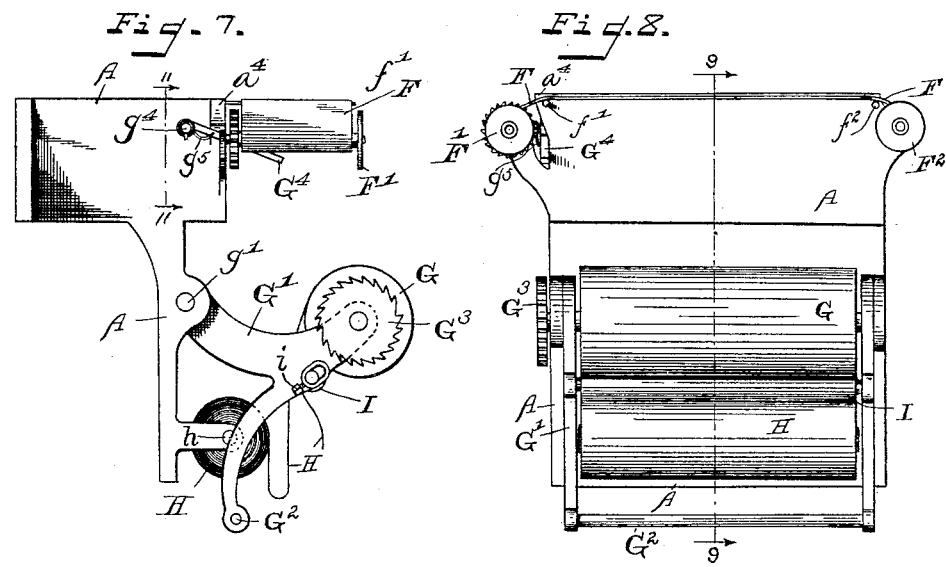
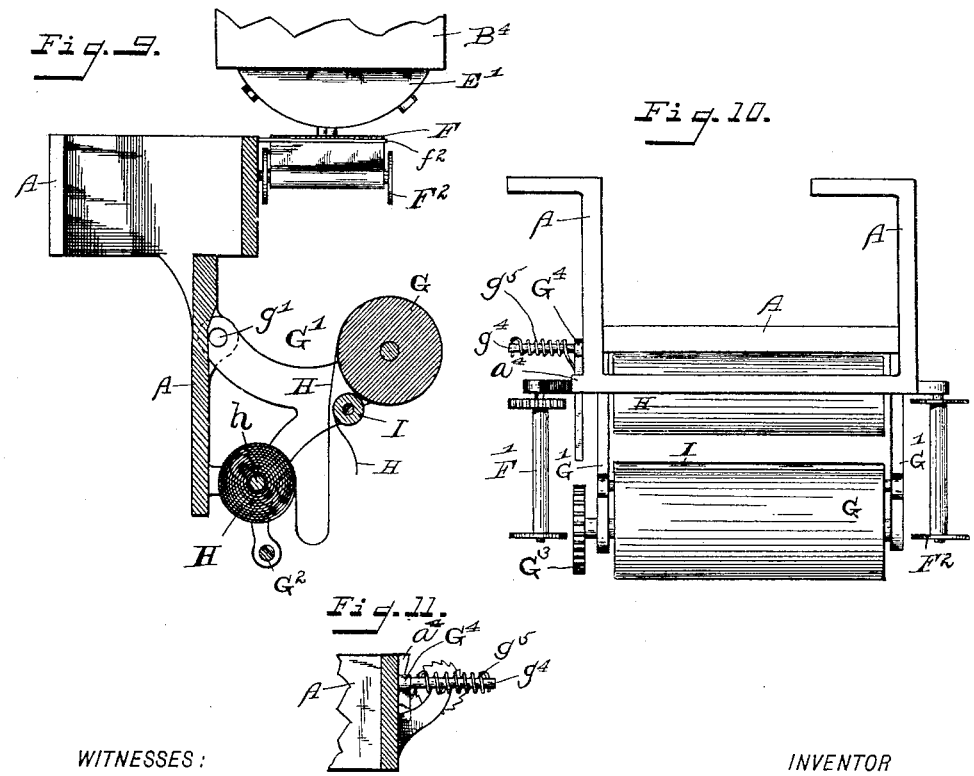
WITNESSES:
INVENTOR
Jason H. Greenstreet,
per
ATTORNEYS

UNITED STATES PATENT OFFICE.

JASON H. GREENSTREET, OF INDIANAPOLIS, INDIANA, ASSIGNOR TO CHARLES J. GREENSTREET AND FLORA V. GREENSTREET, BOTH OF SAME PLACE.

INDICATING AND RECORDING BALANCE.

SPECIFICATION forming part of Letters Patent No. 478,232, dated July 5, 1892.

Application filed March 10, 1892. Serial No. 424,362. (No model.)

*To all whom it may concern:*

Be it known that I, JASON H. GREENSTREET, a citizen of the United States, residing at Indianapolis, in the county of Marion and State of Indiana, have invented certain new and useful Improvements in Scales, of which the following is a specification.

The principal object of my invention is to provide with a scale or weighing apparatus an indicating device by which the sum of the weights indicated on the several bars or divisions of the scale-beam may be shown and read at one point.

A further object is to print or permanently register at one point each of such sums of weights upon a strip of paper or other suitable material, so that the same may be preserved.

Said invention will be first fully described, and then pointed out in the claims.

Figure 1:
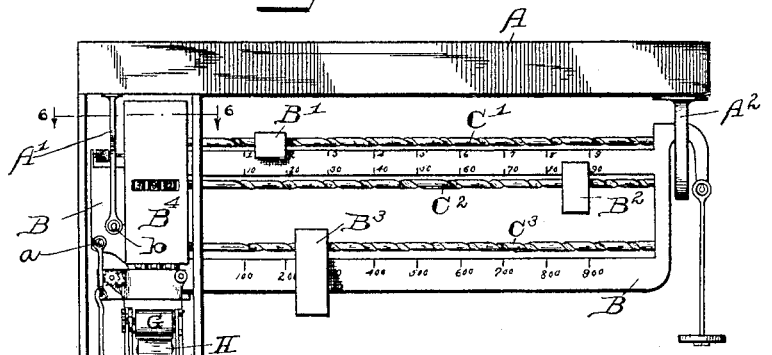
Figure 2:
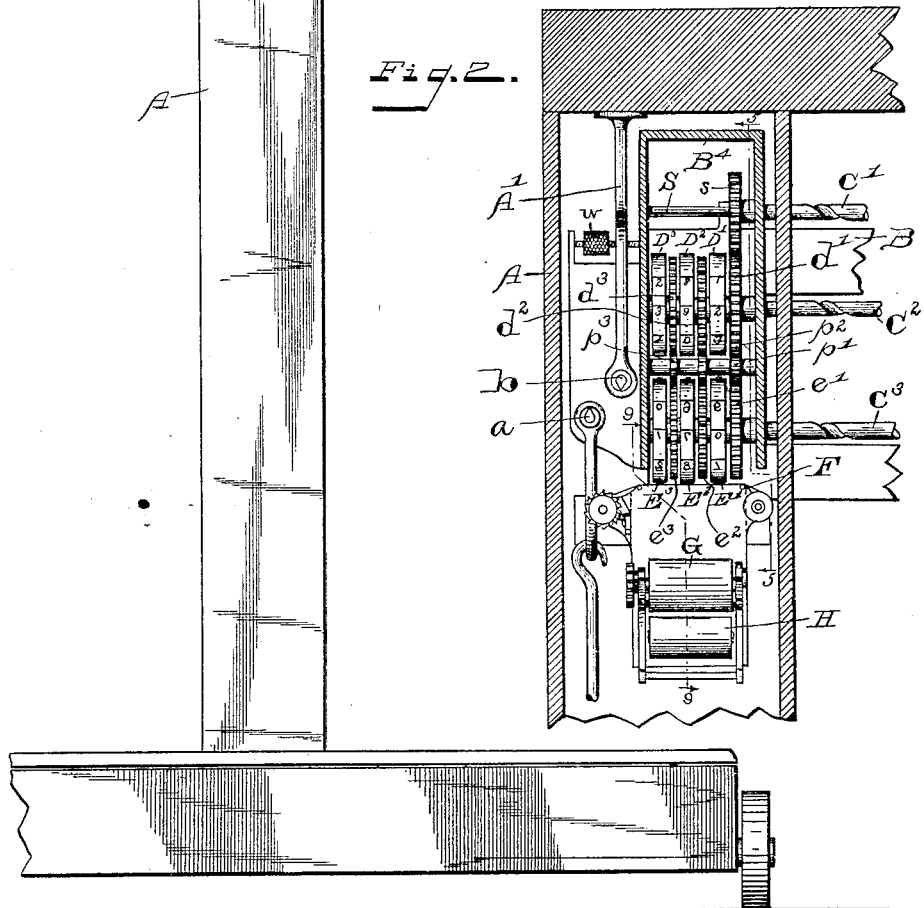

Referring to the accompanying drawings, which are made a part hereof and on which similar letters of reference indicate similar parts, Figure 1 is a front elevation of a scale embodying my said invention; Fig. 2, a detail sectional view of the portions which more particularly embody said invention; Fig. 3, a similar view from the rear side; Fig. 4, an end elevation of the mechanism; Fig. 5, a sectional view looking toward the left from the dotted line 5 5 in Fig. 2; Fig. 6, a horizontal sectional view looking downwardly from the dotted line 6 6 in Fig. 1; Fig. 7, a side elevation of the printing attachment separately, on an enlarged scale; Fig. 8, a front elevation of the same; Fig. 9, a vertical sectional view thereof; Fig. 10, a top or plan view, and Fig. 11 a detail sectional view as seen from the dotted line 11 11 in Fig. 7.

In said drawings the portions marked A represent the frame-work of the scale; B, the scale-beam; $C'$, $C^2$, and $C^3$, rods connected to gear-wheels and adapted to be actuated by the scale-weights; $D'$, $D^2$, and $D^3$, disks carrying figures to indicate the weights; $E'$, $E^2$, and $E^3$, disks carrying figures to print the weights; F, a printing-ribbon arranged adjacent to said type-disks of a character similar to a type-writer ribbon; G, a printing-roll; H, a paper-roll; I, a small roller adjacent to the printing-roll G, which, with said printing-roll, grips and pulls forward the paper from the roll H.

The frame-work A is or may be of any ordinary or desired form or construction. It carries the hanger $A'$, by which the scale-beam is supported, and the guide-clip $A^2$, as usual, and such other bearings and attachments as are usual and proper in weighing apparatus.

The scale-beam B is designed to carry several poises. It is shown as carrying three, (lettered $B'$, $B^2$, and $B^3$,) and is provided, of course, with graduations for each. It has the usual knife-edges $b$ and $a$, the former of which is mounted in appropriate bearings in the hanger $A'$, whereby said scale-beam is supported, and the other of which carries by appropriate connections the rods which run down to and are connected to the mechanism which supports the platform of the scale in a usual and well-known manner. It should also be provided with the usual adjusting-weight $w$. It has attached thereto and practically formed integrally therewith a housing or casing $B^4$, which contains the bearings for the shafts of the disks and the gear-wheels by which they are operated, as well as bearings for the rods or other devices through which the poises actuate said gears and disk.

The rods $C'$, $C^2$, and $C^3$ are journaled at the ends in bearings in the scale-beam and bear upon their rear ends the spur-gears $c'$, $c^2$, and $c^3$, which engage with and rotate the corresponding figure-carrying disks, as will be presently explained. The rod $C'$ is so connected as to rotate the disks $D'$ and $E'$, the rod $C^2$, the disks $D^2$ and $E^2$, and the rod $C^3$, the disks $D^3$ and $E^3$. These rods, as shown, are formed like long-pitch coarse-threaded screws and pass through perforations in the poises $B'$, $B^2$, and $B^3$, into which perforations projections extend from the said poises and engage with the threads or grooves of said rods. Said poises, being also mounted upon or engaging with the bars of the scale-beam, are not permitted to revolve, and therefore when moved longitudinally they revolve these rods with their gear-wheels and the figure-carrying disks, as will be readily understood. These rods are connections between the poises and number-bearing disks simply, and other forms of connection might be substituted without departing from my invention.

The figure-carrying disks $D'$, $D^2$, and $D^3$ are loosely mounted upon the shaft D and are driven, respectively, from the rods $C'$, $C^2$, and $C^3$, as above stated. The disks $E'$, $E^2$, and $E^3$ (mounted on the shaft E) being driven at the same time, the complete operation of both sets of disks will be described. The disk $D'$ is driven from the rod $C'$ through the pinion $c'$ and the spur-gears $s$ on the shaft S and $d'$ on the shaft D, and the latter, through the pinion $p'$ (on the shaft P) and the spur-gear $e'$, drives the disk $E'$. The disk $D^2$ is driven from the rod $C^2$ through the pinion $c^2$ and the spur-gear $d^2$, and the latter, through the pinion $p^2$ and the spur-gear $e^2$, drives the disk $E^2$. In the case of the disk $D^3$ the operation is reversed, and it is the last of the series. The disk $E^3$ is driven from the rod $C^3$ through the pinion $c^3$ and the spur-gear $e^3$, and the latter, through the pinion $p^3$ and the spur-gear $d^3$, drives the disk $D^3$. If this invention is employed in a scale of greater capacity than the one herewith illustrated, more rods and disks will be added; but the operation will be substantially the same. This operation is illustrated in Fig. 1 by showing the units-poise $B'$ at the mark "2" on the scale-beam, the tens-poise $B^2$ at the mark "90," and the hundreds-poise $B^3$ at the mark "300." The sum "392" is displayed in the slot in the inclosing housing or casing on the face of the upper set of figure-carrying disks $D'$, $D^2$, and $D^3$. The figures on these disks are ordinary figures in position to be read. The figures on the disks $E'$, $E^2$, and $E^3$ are instead in the form of type-faces ready to print, and the various disks and gear-wheels are so arranged that when the figures on the upper set of disks are exposed to the front the corresponding ones on the lower set will be at the bottom above the type-ribbon F ready to print. These several disks may be and preferably are, as shown, of a wheel-like formation, with the figures on their peripheries; but they may be flat or straight instead and may have a reciprocal instead of a rotary movement without departing from my invention.

The type-ribbon F is or may be similar to the ribbons used in type-writers and runs on spools $F'$ $F^2$, which are above and a little outside the ends of the rolls G, H, and I. As shown most plainly in Fig. 8, it passes over pins $f'$ $f^2$ and is supported in position adjacent to the disks $E'$, $E^2$, and $E^3$ by said pins. Upon one end of the spool $F'$ is a ratchet-wheel, which may be and usually is one of the heads of said spool, whereby, by means of a pawl, it is caused to revolve and wind the ribbon as the printing proceeds, as will be presently described. The roll G is mounted in a frame $G'$, pivoted, as at $g'$, to appropriate bearings in the frame A. Attached to said frame $G'$ is a handle $G^2$, by which the structure may be conveniently swung upward, bringing the roll G against the under side of the type-ribbon, forcing it against the face of the projecting type-like numbers on the disks $E'$, $E^2$, and $E^3$, leaving an impression of said figures upon a sheet of paper or other impression-receiving material passing over said roll G, as will now be described. The roll H is a roll of paper or other suitable material for the purpose mounted upon a shaft $h$, resting in appropriate bearings on the framework A. Said paper continues up over the roll $G'$ and nearly around said roll to between it and the roll I and is adapted to receive the impressions from the type-faces on the disks and thus record the weights. Said roll I is mounted in bearings in the swinging frame $G'$ and its surface is in close contact with the surface of the roll G. Said bearings are elongated somewhat, as shown most plainly in Fig. 7, and the roll is adapted to be adjusted to bear with more or less force against the roll G by set-screws $i$ or otherwise. The purpose of this roll is to grip and hold the paper H so that it will be drawn forward in the operation of the device.

The operation of this printing device is as follows: The paper H being in place, the frame $G'$ is swung upwardly, preferably by being grasped by the handle $G^2$, and the paper resting on the surface of the roll G is forced against the type-ribbon, which is in turn forced against the face of the type or figures on the disks, and through the medium of said type-ribbon said figures leave an impression upon said paper. The ratchet-wheel $G^3$ is secured on the outer end of the shaft of the roll G, and as it swings upward it comes in contact with the pawl $G^4$, secured on a stud or pivot $g^4$ on the frame-work A. The swinging of said pawl on its pivot projects its end sufficiently to turn the roll G a distance equal to the size of one of the teeth in the ratchet-wheel $G^3$, thus drawing the paper, which is held tightly between the rolls G and I, around said roll a sufficient distance so that the previously-printed number thereon will be in advance of the point where the type-figures strike the paper at the completion of the operation, and thus insuring that the new number printed shall be just above the one previously printed in a vertical column ready for addition when the paper is removed from the machine. At the same time the pawl $G^4$ strikes the cam projection $a^4$, (see particularly Figs. 7 and 10,) throwing it sidewise sufficiently to cause it to engage with the ratchet-wheel forming one of the heads of the spool $F'$, thus revolving said spool slightly and shifting the ribbon so that the next impression will be upon a different portion of it. A coiled spring $g^5$ surrounds the pivot $g^4$ and is attached to said pivot at one end and to the pawl $G^4$ at the other. This spring has two functions. It both holds the pawl sidewise against the surface of the frame-work A until it is forced sidewise by the cam-projection $a^4$, and also serves to return said pawl to its lower position when the printing-roll is dropped out of engagement.

By the use of my invention the sum of all the weights indicated by the positions of the poises on the scale-beam is displayed at a certain point where it can be easily and accurately read, and said sum of weights by simply lifting the frame-work G' by the handle or otherwise, as just described, is printed or impressed upon a strip of paper, and this paper is successively moved along a space at a time automatically by the operation of the printing mechanism itself, so that when a series of weighings is completed they are all registered in figures ready to be added up, and a record of each separate weighing may thus also be preserved, if desired. It will be observed in the drawings that the paper hangs loosely between its roll and the printing-roll G. When, however, the printing-roll is raised, the paper is stretched taut, so that perfect evenness in printing is secured. It is only loose when the printing-roll attachment is in its lower or normal position.

Having thus fully described my said invention, what I claim as new, and desire to secure by Letters Patent, is—

1. The combination, in a scale, of several poises, corresponding disks bearing numbers, and connections between the several poises and the disks, whereby the numbers on said disks are made to display the sum represented by the several poises on the scale-beam.

2. The combination, in a scale, of a scale-beam having several sliding poises representing, respectively, units, tens, hundreds, and so on, number-bearing disks corresponding thereto, and connections between said poises and said disks, whereby in weighing an article the figures caused to be displayed at the observation-point on the face of the disks will represent the combined weights as represented by the poises on the scale-beam.

3. The combination, in a scale, of a scale-beam having several poises, a corresponding number of disks, screw-threaded rods passing through the poises and geared to the disks, whereby as the poises are moved along the scale-beam the rods are revolved and through the gearing move the disks, substantially as and for the purposes set forth.

4. The combination, in a scale, of the scale-beam B, the screw-rods C', C², and C³, mounted thereon and parallel therewith, the poises B', B², and B³, mounted on said scale-beam and adapted to revolve said screw-rods as they are moved longitudinally thereof and the several gear-wheels and pinions driven thereby, and the number-bearing disks D', D², and D³ and E', E², and E³, said several parts being arranged and operating substantially as and for the purposes set forth.

5. The combination, in a scale, with the scale-beam, of disks carrying printing-numbers, a number of poises on the scale-beam corresponding to the number of disks, connections between the same, and a printing attachment adapted to be brought into contact with said printing numbers or type and print the number represented by the weights on the scale-beam on impression-receiving material carried thereby.

6. The combination, with a scale or weighing mechanism and a series of type-bearing disks connected therewith, of a printing device consisting of a ribbon running over spools adjacent to said disks, a roller mounted in a swinging frame and carrying paper, a friction-roll for holding and drawing said paper forward, a ratchet-wheel on the end of the printing-roll shaft, and a pawl pivoted to the frame-work near the terminal point of the movement of said roll on said swinging frame which is adapted to come in contact with said ratchet-wheel and impart a rotary motion to said printing-roll.

7. The combination, with a scale having type-bearing disks connected to and driven by the weighing mechanism, of a printing apparatus consisting of a type-ribbon mounted on spools at a point adjacent to said disks, a ratchet-wheel connected to said spool, a printing-roll mounted in a swinging frame, and a pawl pivoted to the frame-work near said ratchet-wheel and adapted to be raised by said roller when it is lifted and engage with said ratchet-wheel, thereby revolving the spool and pulling the ribbon, substantially as set forth.

8. The combination, in a scale, of a mechanism carried by the scale-beam consisting of two or more poises, a corresponding number of disks, and connections between said poises and said disks, respectively, whereby said disks are caused to display figures indicating the weight also represented by the sum of weights indicated by the poises.

9. The combination, in a scale, of several poises mounted on a single scale-beam and corresponding disks connected with each poise, respectively, said disks bearing figures indicating numbers corresponding with the positions of the poises and the whole being arranged upon and carried by said scale-beam, substantially as set forth.

In witness whereof I have hereunto set my hand and seal, at Indianapolis, Indiana, this 5th day of March, A. D. 1892.

JASON H. GREENSTREET. [L. S.]

Witnesses:
CHESTER BRADFORD.
J. A. WALSH.